United States Patent [19]
Eckel et al.

[11] Patent Number: 5,666,862
[45] Date of Patent: Sep. 16, 1997

[54] TORSIONAL VIBRATION DAMPER

[75] Inventors: Hans-Gerd Eckel, Laudenbach; Anja Kunkel, Siedelsbrunn; Michael Müller, Darmstadt, all of Germany

[73] Assignee: Firma Carl Freudenberg, Weinheim, Germany

[21] Appl. No.: 341,820

[22] Filed: Nov. 18, 1994

[30] Foreign Application Priority Data

Nov. 26, 1993 [DE] Germany .............. 43 40 293.3

[51] Int. Cl.6 ............................................. F16F 15/136
[52] U.S. Cl. ................................. 74/574; 464/180
[58] Field of Search .............................. 74/572, 573 R, 74/574; 192/30 V; 464/180

[56] References Cited

U.S. PATENT DOCUMENTS

| | | | |
|---|---|---|---|
| Re. 20,773 | 6/1938 | Sarazin | 74/574 |
| 3,296,887 | 1/1967 | Larsen | 74/574 |
| 3,372,758 | 3/1968 | Jenney | 74/574 |
| 4,095,485 | 6/1978 | Hiersig | 74/574 |
| 4,791,829 | 12/1988 | Fukushima et al. | 74/574 |
| 4,850,244 | 7/1989 | Eckel et al. | 74/574 |
| 4,995,282 | 2/1991 | Schumacher | 74/572 |
| 5,188,002 | 2/1993 | Wolf et al. | 74/574 |
| 5,269,197 | 12/1993 | Yang | 74/574 |
| 5,415,061 | 5/1995 | Kohno | 74/574 |

*Primary Examiner*—Charles A. Marmor
*Assistant Examiner*—Mary Ann Battista

[57] ABSTRACT

A torsional vibration damper for a shaft rotating about an axis. The damper comprises a hub element joined to the shaft, such that at least two inertial masses, pivotable in the peripheral direction about pivot axes, are retained on the hub element. At least one spring for each inertial mass is provided to determine the static position of the inertial masses. The pivot axes lie between the inertial masses and the axis of the shaft.

26 Claims, 5 Drawing Sheets

TORSIONAL VIBRATION DAMPER

BACKGROUND OF THE INVENTION

The invention relates to a torsional vibration damper for a shaft rotating about an axis. An apparatus of this general type has a hub element joined to the shaft, and at least two inertial masses, pivotable about pivot axes, that are joined by tension elements to the hub element. The pivot axes of the inertial masses extend parallel to the shaft axis, and are arranged between the inertial masses and the shaft axis so that a change in the distance between the inertial masses and the shaft axis occurs whenever a pivot motion occurs.

A torsional vibration damper of this general type is known. It is utilized on the crankshaft of an internal combustion engine and is based on the recognition that centrifugal (or centripetal) forces cause the inertial masses to circle around the axis at the greatest possible distance when a rotary movement is introduced. The masses are mounted on pivot axes that are arranged in the intermediate zone between their center of gravity and the main shaft axis. Torsional vibrations that are superimposed on the rotary motions consequently result in a relative movement of the inertial masses radially inwardly, which has the effect of dampening the excitational torsional vibrations. The efficiency achieved by such devices is not entirely satisfactory. In addition, clattering noises may occur with the use of such a device during the startup and coasting phase of the internal combustion engine.

There remains a need to further develop this type of a torsional vibration damper so as to produce an improvement in damping efficiency over a wide frequency range, while reliably eliminating clattering noises in the startup and coasting phases of engine use.

SUMMARY OF THE INVENTION

In the present invention meets this need with a torsional vibration damper for a rotating shaft. The damper comprises a hub configured to be joined to the shaft for rotational movement therewith, and at least two inertial masses pivotably linked to the hub by tension elements. The tension elements may take any of several forms, including a lever or a belt.

In accordance with the torsional vibration damper of the invention, provision is made for each inertial mass to be displaceable by means of at least one return spring from the neutral position it is in when not rotating to a position that varies in distance from the axis of rotation in dependence upon the centripetal forces acting on the inertial masses. This movement occurs during rotation, and is mediated by both the centripetal forces of rotation and the counter-force supplied by the elastic deformation of the return springs. In the torsional vibration damper of the invention, because the radial relative displacements of the inertial masses are accompanied by the elastic deformation of the return springs, the inertial masses cannot move freely in the radial direction. This prevents the occurrence of clattering noises during the startup and coasting phase for a shaft equipped with the torsional vibration damper.

The effect of the return springs also means that relative displacements of the inertial masses are always accompanied by reaction forces of variable magnitude, which are transferred to the shaft. The smooth transference of such forces provides a good dampening effect to vibrations, regardless of the respective rotational speed at which torsional vibrations may be introduced.

The tension elements by which the inertial masses are joined to the hub element can assume several forms. In one embodiment, tension- and compression-resistant arm elements joined articulately at least to the hub elements are used. In such embodiments, the return springs are provided as separate components.

Alternatively, the function of the return springs can be combined with that of the tension elements. For example, leaf springs that can be deflected in the lateral direction can be utilized to fasten the inertial masses to the hub element. These can be fastened nondisplaceably both to the hub element and to the inertial masses, which substantially simplifies the manufacture of a torsional vibration damper configured in this fashion.

For large-scale production, an embodiment in which the inertial masses and a hub element are joined by at least one flexible belt is particularly useful. This belt can be configured to be nonextensible by the centrifugal forces that arise during use, and may be constructed from a cable or a thin metal strip.

According to another embodiment, an annular coiled spring is employed to enable the belt to be elastically extensible by the centrifugal forces that arise during use of the device.

The torsional vibration damper can be produced particularly simply if only one belt is used. In this embodiment, the belt snakes about the inertial masses by fitting around the inertial masses and a series of projections attached to the hub that are axially linked with the hub. These projections lie at a distance intermediate the center and the periphery of the hub. In this embodiment, the belt is configured as an endless and continuous loop, which extends generally circumferentially about the hub by sequentially and alternately snaking around the radial exterior of a given inertial mass and then radially inwardly about the projections on the hub element.

It has proven to be advantageous to provide for each inertial mass two circumferentially spaced apart projections on the hub element. The projections can be spaced a very small distance from one another that is less than the width of the associated inertial mass. In this case, a laterally extending spreader element is provided in each space between the inertial masses and the projections. The two sections of the belt extending from each of the inertial masses in the direction of facing sides of the projections are brought by the spreader element into a substantially parallel and opposed configuration.

In embodiments in which the inertial masses are joined to the hub element by means of a flexible belt, it is advantageous that all of the surface areas of the inertial masses, the projections, and the spreader element (where such are present) that are used to effect a change in the direction of the belt have a rounded shape. This rounding substantially improves the durability of the belt, which is exposed during use to continuous bending stresses.

Particularly good damping efficiency can be obtained by making the return spring of an elastomeric material, such as rubber. The use of such a material for the spring elements simplifies construction of the device, as rubber can be fastened by direct vulcanization onto the parts being joined during shaping and consolidation.

In order to protect the belt from corrosion, it may be at least partially embedded in the elastomeric material or even adhesively bonded thereto. Any undesired relative displacements between belt and rubber, which could lead to an impairment of usability, can thereby be prevented.

The belt can consist of a cable, a single- or multilayer steel belt, or a flat belt reinforced with plastic fibers or steel cables. It is best to use belts that have a particularly low wall thickness in the radial direction. In such embodiments, the necessary tensile strength is achieved by a correspondingly large width, measured parallel to the axis of the torsional vibration damper.

In a further embodiment, each mass is assigned to its own belt. In this case, the belt is configured as a closed ring in the manner of a loop, and laid externally around the individual mass and its associated elements. When the torsional vibration damper is in the nonrotating state, each mass is urged by the return springs into a shape from which it can be displaced by the centrifugal forces that arise during use. This shape can be approximated to that of a figure-8 if a tension spring that causes a constriction of the loop-shaped belt between the hub element and the inertial masses is utilized as the return spring.

Alternatively, the shape of the belt can also be that of an "O" if a compression spring that causes peripherally directed spreading of the loop-shaped belt between each inertial mass and the hub element is utilized as the return spring.

In each case, the centrifugal forces which occur during operation result in increasing extension of the belt with increasing rotational speed, and thus also in an increase in the distance between the inertial masses and the axis. Consonant with this, the belt is configured so that, between the hub element and each inertial mass, there are at least two points opposite one another that are moved by the return spring into an uneven shape when the torsional vibration damper is not rotating. The points in question can, if applicable, also constitute components of separately produced and installed belts.

If necessary, the inertial masses can also be joined to the hub element by tension elements that are independent of one another. An embodiment of this kind is recommended when it is desirable to join to a hub element inertial masses whose distances from the axis differ from one another, and/or have sizes differing from one another. An embodiment of this kind is of particular advantage in terms of achieving a vibration canceling effect over a wide frequency range.

DETAILED DESCRIPTION

Figure 1:
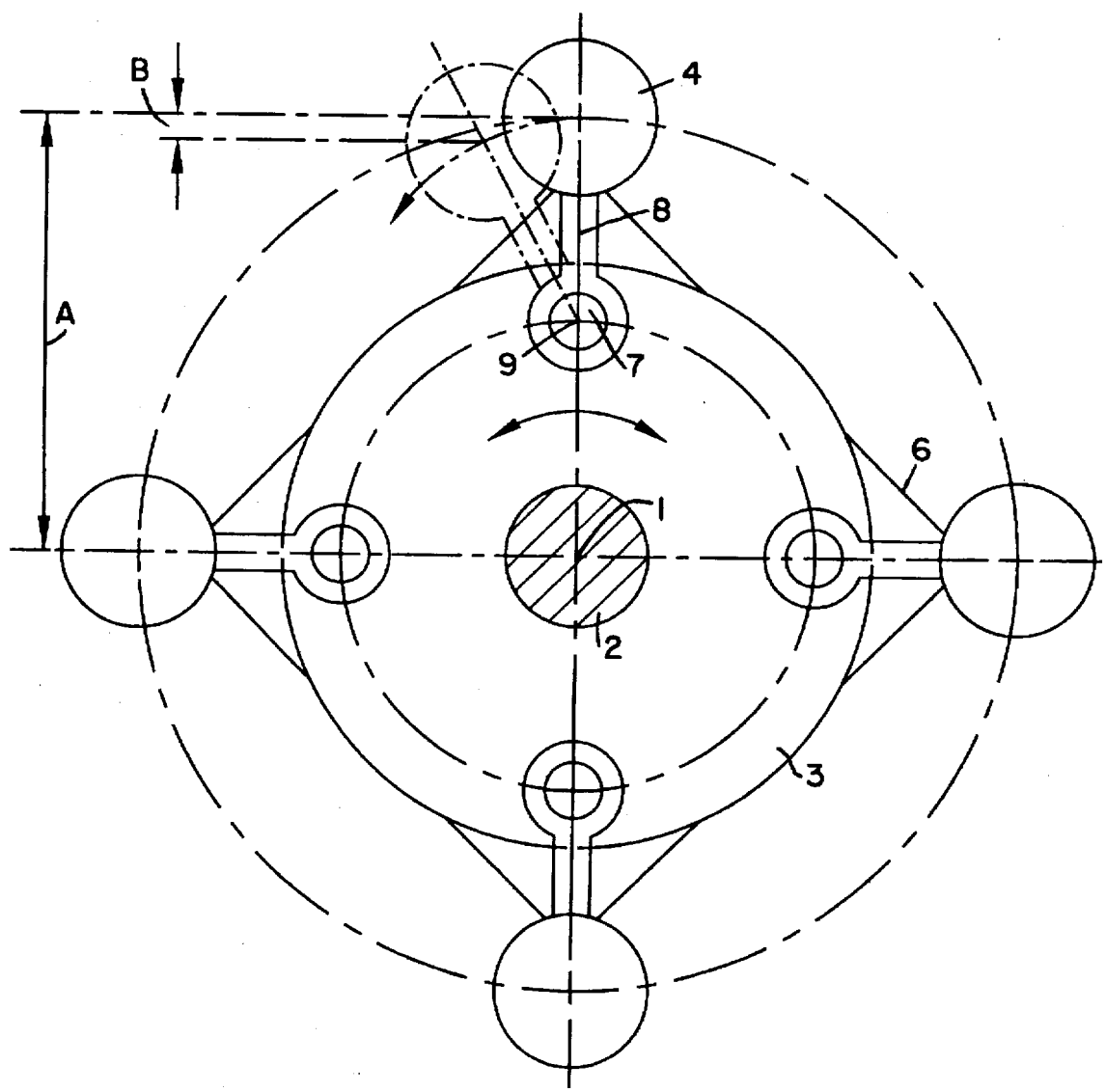
FIG. 1 is a schematic depiction of a first embodiment of a torsional vibration damper constructed according to the principles of the invention.

The torsional vibration damper shown in FIG. 1 is configured for use with a shaft rotating about an axis. It comprises a hub element 3, which is nonrotatably joined to a shaft 2 that is rotatable about an axis 1. The visible portion of hub element 3 is configured substantially like a flange. Four cylindrically extending projections 7 are provided along the annular region of the outer periphery of the hub. These projections 7 are uniformly distributed in the circumferential direction and extend parallel to the shaft 2. Pivot levers 8 are mounted on the projections 7 so as to be pivotable in the peripheral (i.e., circumferential) direction. These pivot levers 8 are integral with the inertial masses 4. In the resting state, the masses 4 constitute the radially terminal ends of the pivot levers 8.

The inertial masses 4 are further supported on the hub element 3 by return springs 6 that are made of rubber. The masses and return springs are configured so that when the torsional vibration damper is not rotating, the center of gravity of each mass 4 is at the maximum possible distance A from axis 1 of the shaft 2. As a result of the use of such materials, when shaft rotary movement begins, no clattering sounds are produced by mutual contact between the inertial masses 4 and the hub element 3. Moreover, the damping effect provided can be utilized over the entire range of rotation speed, beginning at zero speed.

A laterally directed relative displacement of the inertial masses 4 with respect to the shaft 2 occurs when torsional vibrations are introduced via shaft 2. This relative displacement results in the elastic deformation of the return springs 6, which causes a damping effect to occur. Concomitantly, the centers of gravity of the inertial masses 4 move along circular arcs about pivot axes 9, which in the torsional vibration damper according to the invention are always at a radial distance from axis 1. Consequently, the torsional vibrations simultaneously cause a radial back-and-forth movement of the inertial masses 4 as the shaft rotates, the magnitude of which depends on the amplitude of the externally imposed torsional vibrations introduced at the same time. The magnitude of this radial oscillation is indicated in FIG. 1 by dimension B. The net effect of these movements is to dampen the torsional vibrations to a high degree.

Figure 2:
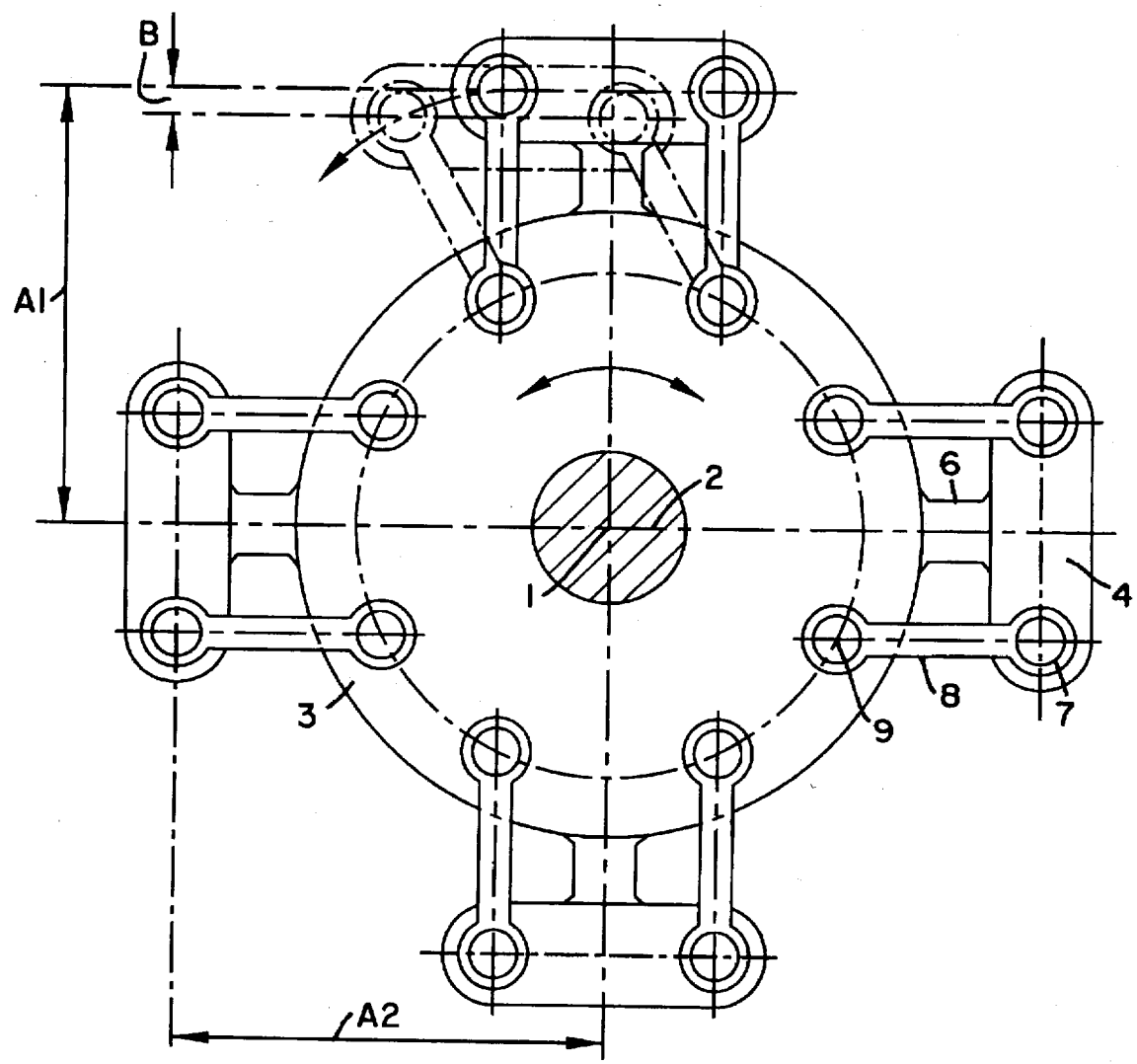
FIG. 2 is a schematic depiction of a second embodiment of the torsional vibration damper constructed according to the principles of the invention.

FIG. 2 illustrates an embodiment of a torsional vibration damper in which each inertial mass 4 is joined to the hub element 3 by two pivot levers 8 adjacent in the circumferential direction. These levers 8 extend substantially parallel to one another and are joined in an articulated manner to both the hub element 3 and to the inertial masses 4. This arrangement provides for a clearance in the radial space between the inertial masses 4 and the hub element 3 in which one or more return springs 6 of considerable size can be housed. The provision of such ample space permits the vibration-damping properties of elastomeric material to be utilized in a particularly advantageous fashion.

The inertial masses 4 lying diametrically opposite one another direction are each at an identical distance from the axis; adjacent pairs of inertial masses lie at differing distances from the axis 1. In other words, distances A1 and A2 of adjacent inertial masses are different. This permits the expansion of the frequency range in which a good dampening effect is achieved, making such configurations particularly suitable for use in applications with internal combustion engines.

Figure 3:
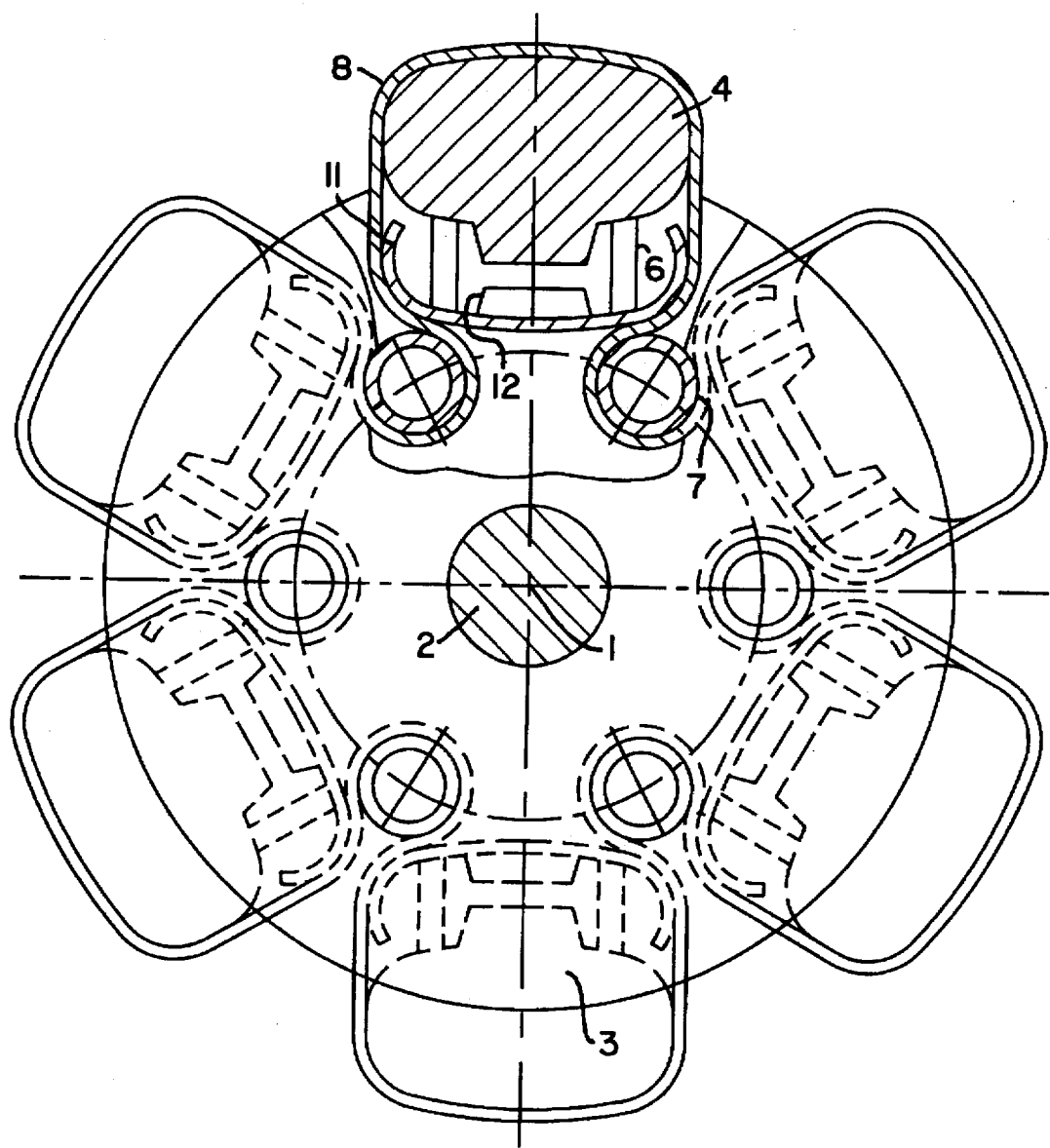
FIG. 3 shows a third embodiment in which the inertial masses and the hub element are joined by an endless and continuous belt.

The embodiment shown in FIG. 3 is similar in terms of function to that outlined in FIG. 2, but differs in several respects. Six inertial masses, joined to hub element 3 by a flexible belt 8, are evenly distributed about the periphery of the hub. These masses 4 are linked to each other by an endless flexible belt 8, which alternately loops around the inertial masses 4 on their outer sides, and projections 7 (which are configured integrally with hub element 3) on their inner sides. Two projections 7 of hub element 3 are associated with each inertial mass 4. The two projections each form a retainer pair with respect to the inertial mass 4 that is located radially inwardly of each mass. The distance between projections 7 as measured in the circumferential direction is less than the width of its associated inertial mass 4 (again, as measured in the circumferential direction).

In order to assure that the portions of the belt 8 projecting from inertial masses 4 toward axis 1 extend parallel to one another at least along the sides of a given mass 4, a spreader element 11 is arranged in each space between the projections 7 and the inertial masses 4. Under normal operating conditions, the spreader element is nondeformable and integral with the hub element 3.

In this embodiment, the inertial masses 4 are supported by two return springs 6 mounted onto the spreader element 11. The return springs associated with a given mass are laterally spaced apart from one another, but are connected to each other at the spreader element 11. The area in which the return springs 6 connect to each other includes an intermediate zone of thickened material that forms a contact buffer 12. When especially large radially directed inward movements occur, the inertial masses 4 engage the elastic material of this buffer. This limits the scope of such movements, and also prevents damage to the torsional vibration damper due to such overloads.

All surface zones of inertial masses 4, projections 7, and spreader elements 11 that cause a change in direction of belt 8 are configured to be rounded in the circumferential direction. This rounding prevents kinking stress on belt 8, and results in a substantially extended service life.

Belt 8 is designed to be flexible, and strong in tension with respect to the centrifugal forces occurring during use. In the embodiment shown, it is made of a plurality of plies of a steel cable winding, arranged one on top of the other when viewed in the direction of the axis. The beginning and end of the steel cable are anchored by means of a pressed-on sleeve in a cavity within the projections. The cavity opens outward through a slot facing in the direction of the axis, which serves to guide the ends of the cable toward the interior.

Inertial masses 4 are movable in the circumferential direction and joined to hub element 3 by the belt 8 and by return springs 6. They are further constrained against unwanted movements in the axial direction on either side of the assembly by flange-shaped components located on hub element 3 (these components have been omitted from FIG. 3 for the sake of clarity).

Figure 4:
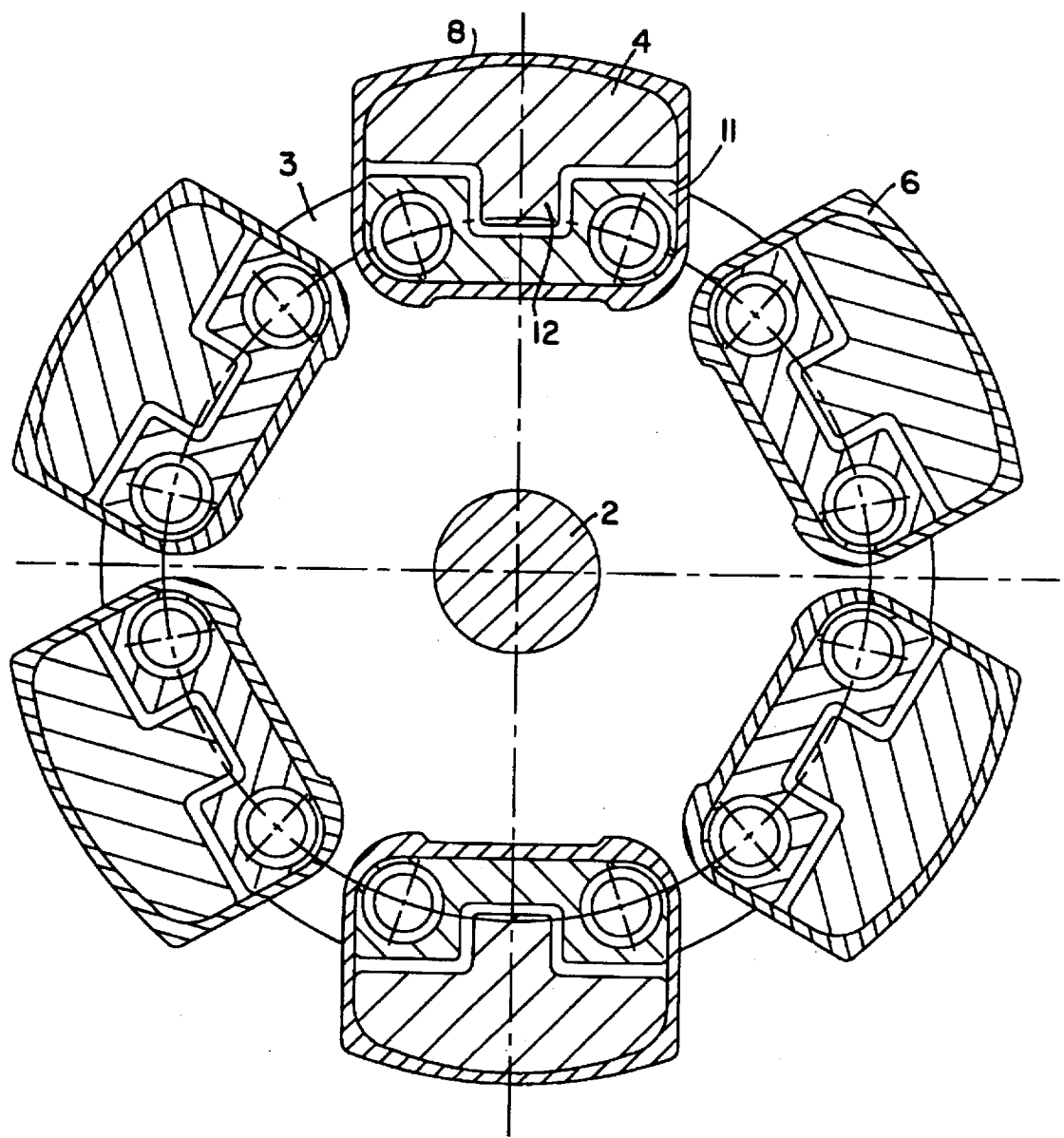
FIG. 4 shows a fourth embodiment in which the damper masses are joined to the hub element by mutually independent, loop-shaped tension elements.

FIG. 4 is a front view, with the covering flange cut away, of an embodiment of the invention in which the spreader element 11 further serves to absorb the centrifugal forces that occur in the region of inertial mass 4 when the torsional vibration damper is rotating. In this embodiment, each mass is assigned a belt 8 that loops around the radial exteriors of the inertial masses and around the radial inner sides of the spreader elements 11, which serves to transfer the centrifugal forces to the hub 3. The belt is embedded in elastomeric material dimensioned so that it operates as the return spring. When the torsional vibration damper is not rotating, this elastomeric material maintains the inertial masses 4 in the neutral position shown in FIG. 4, in which they are at the minimum radial distance from the axis of the torsional vibration damper. In this embodiment, the introduction of torsional vibrations always will always lead to an increase in the distance of the masses from the axis.

In the embodiment shown in FIG. 4, a contact buffer 12 can be provided between each inertial mass 4 and spreader element 11 to limit the possible deflection movements that arise during use.

As shown in FIG. 4, the component parts, i.e., the inertial masses 4, spreader elements 11, and the belts 8 associated with each mass can distributed in a hexagonal pattern about the hub. (The front hub element is not depicted in FIG. 4 for the sake of clarity.) In order to achieved the desired linkage between elements, cylindrical extensions that penetrate axially into holes in spreader elements 11 can be provided at at least one end. These extensions can be bolts.

Figure 5:
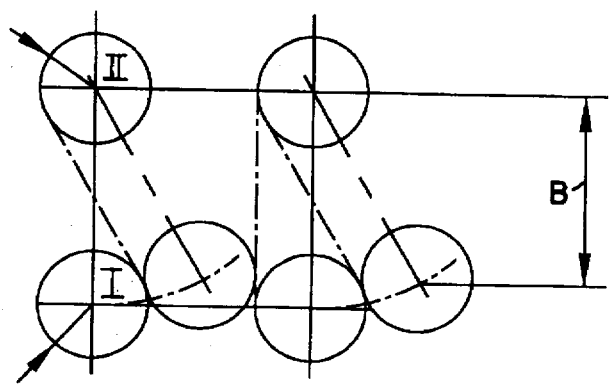
FIG. 5 schematically illustrates the relative displacement of the inertial masses in the embodiment shown in FIG. 4 that occurs during use.

As is evident from FIG. 5, in the embodiment of FIG. 4, the belt 8 enclosing inertial masses 4 on the outside and spreader elements 11 on the inside guides the inertial masses back and forth in the lateral direction on a path that has the shape of a circular arc when torsional vibrations are introduced. The radius of this path is identical to the distance B between curvature center points I and II. The inertial masses, and therefore also their center of gravity, follow a circular path when this kind of vibratory movement occurs. The pivot axis of the inertial masses lies radially at a distance B from the center of gravity of the inertial masses, with reference to the undeflected inertial mass in the direction of the rotation axis.

Figure 6:
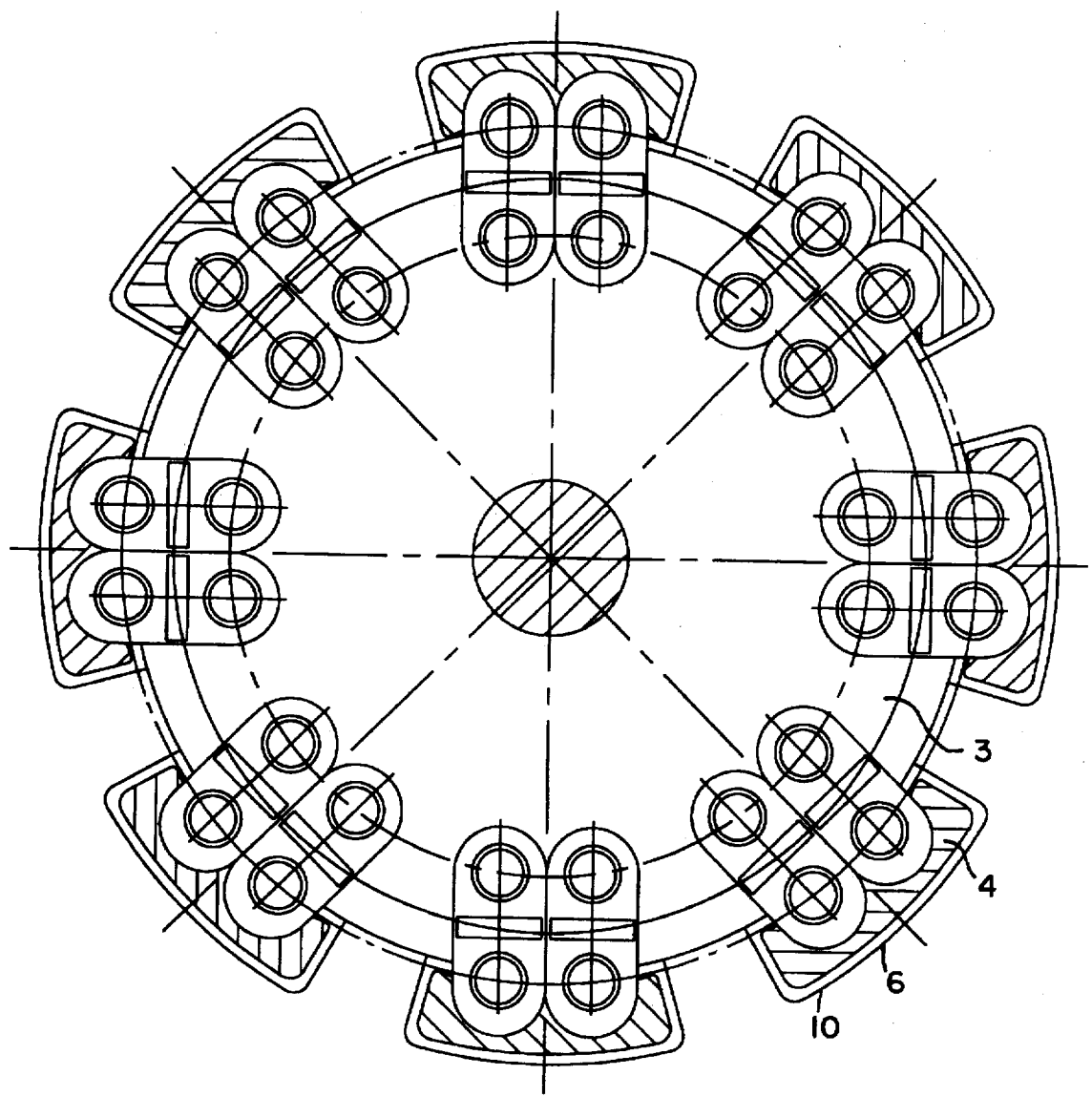
FIG. 6 illustrates a fifth embodiment in which each inertial mass is joined to the hub element by two loop-shaped belts adjacent in the peripheral direction.

The embodiment shown in FIG. 6 is similar in terms of design to the embodiment of FIG. 3. Inertial masses 4 are fastened in each case by two belts 10 in the form of loops that are adjacent in the peripheral direction, which loop around axially parallel projections of inertial masses 4 on the inside, and around hub element 3 on the outside. Belts 10 are spread apart between inertial masses 4 and hub element 3, at two points lying opposite one another in the peripheral direction, by return springs 6 made of flexible rubber material. (The loops may take the form of a wire netting or knitted fabric that is embedded in a viscoelastic material.) The latter are dimensioned and shaped such that when the torsional vibration damper is not rotating, radial contact occurs between the inertial masses 4 and the outer enveloping surface of hub element 3. As rotation speed increases, increasing extension of the belts 10 occurs, with the concomitant elastic deformation of the return springs 6. Consequently, when torsional vibrations are introduced, the inertial masses 4 move back and forth along increasingly large circular tracks. This provides a good dampening effect as a function of the respective rotation speed, and dampens torsional vibrations across a broad frequency range.

What is claimed is:

1. A torsional vibration damper for a shaft rotating about an axis, comprising:

a hub configured to be joined to the shaft for movement therewith about a longitudinally extending central axis;

a plurality of inertial masses;

at least one tension element fixedly connected to each said inertial mass, each said tension element having a pivotable connection to the hub about a pivot axis, such that each said tension element provides a pivotable connection of the inertial mass about the pivot axis, the pivot axes of the tension elements extending parallel to the hub axis and being located between their respective inertial masses and the hub axis; and at least one spring element in association with each said inertial mass, each said spring element being configured to maintain the inertial mass in a neutral position when the hub and the inertial masses are at rest, and providing a force circumferentially directed against the tension element to urge the inertial mass towards its neutral position when the inertial mass is displaced from its neutral position;

wherein the distance between the hub axis and the inertial masses varies in dependence upon the centripetal forces that arise when the torsional vibration damper rotates which are transferred to the inertial masses by way of the tension elements, acting in conjunction with the restorative force acting on the inertial masses that is supplied by the spring elements.

2. A torsional vibration damper as set forth in claim 1, wherein the spring elements are made of an elastomeric material.

3. A torsional vibration damper as set forth in claim 1, wherein each of the inertial masses is joined to the hub by a plurality of separate tension elements.

4. A torsional vibration damper as set forth in claim 1, wherein the distance between the neutral position of the inertial masses and the center of the hub is not the same for all of the inertial masses.

5. A torsional vibration damper as set forth in claim 1, wherein the inertial masses vary in size.

6. A torsional vibration damper as set forth in claim 1, wherein the inertial masses and the hub are joined by at least one flexible belt.

7. A torsional vibration damper as set forth in claim 6, wherein at least all those portions of the surfaces of the vibration damper that transfer loads to the belt are rounded.

8. A torsional vibration damper as set forth in claim 6, wherein the belt is at least partially embedded in elastomeric material.

9. A torsional vibration damper as set forth in claim 6, wherein the belt is configured as a closed ring in the manner of a loop.

10. A torsional vibration damper as set forth in claim 6, wherein each of the inertial masses is joined to the hub by a plurality of separate said tension elements.

11. A torsional vibration damper as set forth in claim 6, wherein the belt is not elastically extensible by the centripetal forces that arise when the torsional vibration damper is rotating.

12. A torsional vibration damper as set forth in claim 11, further comprising at least one axially extending projection located on the hub for each said inertial mass, and wherein said belt comprises a single belt which loops around all the inertial masses along their radially exterior surfaces and loops radially inwardly towards the hub about the projections fastened thereto.

13. A torsional vibration damper as set forth in claim 12, wherein the number of said projections associated with each said inertial mass is two, and wherein these two projections are circumferentially spaced apart.

14. A torsional vibration damper as set forth in claim 13, wherein:
   the spacing between the projections is less than the width of the inertial mass with which the projections are associated; and
   a laterally extending spreader element is provided in the space between the projections and the associated inertial mass, said spreader element serving to laterally spread apart those portions of the belt which extend from the inertial mass to the projections so that these portions of the belt are substantially parallel to one another.

15. A torsional vibration damper as set forth in claim 6, wherein the belt is elastically extensible.

16. A torsional vibration damper as set forth in claim 15, further comprising at least one axially extending projection located on the hub for each said inertial mass, and wherein said belt comprises a single belt which loops around all the inertial masses along their radially exterior surfaces and loops radially inwardly towards the hub about the projections fastened thereto.

17. A torsional vibration damper as set forth in claim 16, wherein the number of said projections associated with each said inertial mass is two, and wherein these two projections are circumferentially spaced apart.

18. A torsional vibration damper as set forth in claim 16, wherein:
   the spacing between the projections is less than the width of the inertial mass with which the projections are associated; and
   a laterally extending spreader element is provided in the space between the projections and the associated inertial mass, said spreader element serving to laterally spread apart those portions of the belt which extend from the inertial mass to the projections so that these portions of the belt are substantially parallel to one another.

19. A torsional vibration damper as set forth in claim 16, wherein the belt is at least partially embedded in elastomeric material.

20. A torsional vibration damper as set forth in claim 6, further comprising at least one axially extending projection located on the hub for each said inertial mass, and wherein said belt comprises a single belt which loops around all the inertial masses along their radially exterior surfaces and loops radially inwardly towards the hub about the projections fastened thereto.

21. A torsional vibration damper as set forth in claim 20, wherein the number of said projections associated with each said inertial mass is two, and wherein these two projections are circumferentially spaced apart.

22. A torsional vibration damper as set forth in claim 21, wherein:
   the spacing between the projections is less than the width of the inertial mass with which the projections are associated; and
   a laterally extending spreader element is provided in the space between the projections and the associated inertial mass, said spreader element serving to laterally spread apart those portions of the belt which extend from the inertial mass to the projections so that these portions of the belt are substantially parallel to one another.

23. A torsional vibration damper as set forth in claim 22, wherein at least all those portions of the surfaces of the inertial masses, the projections, and the spreader element that transfer loads to the belt are smooth.

24. A torsional vibration damper as set forth in claim 22, wherein the spring elements are made of an elastomeric material.

25. A torsional vibration damper as set forth in claim 22, wherein that portion of the belt that is situated between the hub and each said inertial mass includes two opposite areas that are moved by the spring element into an asymmetrical configuration when the torsional vibration damper is not rotating.

26. A torsional vibration damper for a shaft rotating about an axis, comprising:
   a hub configured to be joined to the shaft for movement therewith about a longitudinally extending central axis;
   a plurality of inertial masses;
   at least one tension element fixedly connected to each said inertial mass, each said tension element having a pivotable connection to the hub about a pivot axis, wherein each said tension element is capable of supporting a tensile load, such that each said tension element provides a pivotable connection of the inertial mass about the pivot axis, the pivot axes of the tension elements extending parallel to the hub axis and being located between their respective inertial masses and the hub axis; and at least one spring element in association with each said inertial mass, each said spring element being configured to maintain the inertial mass in a neutral position when the hub and the inertial masses are at rest, and providing a force circumferentially directed against the tension element to urge the inertial mass towards its neutral position when the inertial mass is displaced from its neutral position;

wherein the distance between the hub axis and the inertial masses varies in dependence upon the centripetal forces that arise when the torsional vibration damper rotates which are transferred to the inertial masses by way of the tension elements, acting in conjunction with the restorative force acting on the inertial masses that is supplied by the spring elements.

* * * * *